United States Patent
Bregman et al.

(10) Patent No.: US 11,836,141 B2
(45) Date of Patent: Dec. 5, 2023

(54) RANKING DATABASE QUERIES

(71) Applicant: RED HAT, INC., Raleigh, NC (US)

(72) Inventors: Arie Bregman, Gan Yavne (IL); David Sariel, Holon (IL)

(73) Assignee: Red Hat, Inc., Raleigh, NC (US)

( * ) Notice: Subject to any disclaimer, the term of this patent is extended or adjusted under 35 U.S.C. 154(b) by 10 days.

(21) Appl. No.: 17/493,164

(22) Filed: Oct. 4, 2021

(65) Prior Publication Data
US 2023/0106856 A1 Apr. 6, 2023

(51) Int. Cl.
*G06F 16/2455* (2019.01)
*G06F 16/2457* (2019.01)

(52) U.S. Cl.
CPC .... *G06F 16/24578* (2019.01); *G06F 16/2455* (2019.01)

(58) Field of Classification Search
CPC ....................... G06F 16/24578; G06F 16/2455
USPC ........................................................ 707/723
See application file for complete search history.

(56) References Cited

U.S. PATENT DOCUMENTS

| | | | | |
|---|---|---|---|---|
| 7,809,714 B1* | 10/2010 | Smith | ............... | G06F 16/2425 707/999.005 |
| 8,886,650 B2* | 11/2014 | Wexler | ............... | G06F 16/9535 707/738 |
| 9,092,510 B1 | 7/2015 | Stets, Jr. et al. | | |
| 10,229,199 B2 | 3/2019 | Herbert, Jr. et al. | | |
| 10,289,622 B2 | 5/2019 | Buchmann | | |
| 10,606,872 B1* | 3/2020 | Shelton | ............... | G06F 16/3328 |
| 11,030,195 B2* | 6/2021 | Singh | ................. | G06F 16/2453 |
| 11,294,974 B1* | 4/2022 | Shukla | .............. | G06F 16/90335 |
| 2005/0010558 A1* | 1/2005 | Dettinger | ............ | G06F 16/2455 |
| 2005/0234877 A1 | 10/2005 | Yu | | |
| 2005/0278314 A1* | 12/2005 | Buchheit | ............. | G06F 16/9577 |
| 2008/0250060 A1* | 10/2008 | Grois | .................... | G06F 16/951 707/999.005 |
| 2009/0204753 A1* | 8/2009 | Bridge, Jr. | ............ | G06F 12/123 711/E12.001 |

(Continued)

FOREIGN PATENT DOCUMENTS

EP 2913764 B1 12/2017

OTHER PUBLICATIONS

Batra et al, "Content Based Hidden Web Ranking Algorithm(CHWRA)", Department of IT, MRIU, Faridabad, PTU Jalandhar, Department of IT, MRCE, Faridabad, India, Department of Computer Engineering, SUSCET, Tangori Mohali, India; Department of Computer Engineering, Lingaya's GVKS Institute of Technology, Faridabad, India, 2014, 4 pages. https://ieeexplore.ieee.org/document/6779390.

(Continued)

*Primary Examiner* — Hanh B Thai
(74) *Attorney, Agent, or Firm* — Lowenstein Sandler LLP (57) ABSTRACT

Systems and methods of the disclosure include: submitting, by a processing device, a plurality of queries to a database associated with an application, wherein each query of the plurality of queries comprises a request for one or more records from the database; determining a period of time for executing each query of the plurality of queries; and executing each query of the plurality of queries, wherein executing each query comprises returning a set of portions of the one or more records within the period of time.

20 Claims, 5 Drawing Sheets

SUBMIT A PLURALITY OF QUERIES TO A DATABASE ASSOCIATED WITH AN APPLICATION 302

DETERMINE A RANKING ASSIGNED TO EACH QUERY 304

EXECUTE EACH QUERY OF THE PLURALITY OF QUERIES 306

(56) References Cited

U.S. PATENT DOCUMENTS

| | | | | |
|---|---|---|---|---|
| 2010/0204557 | A1* | 8/2010 | Kiaie | A61B 5/411 |
| | | | | 707/E17.014 |
| 2011/0125739 | A1* | 5/2011 | Wexler | G06F 16/9577 |
| | | | | 707/723 |
| 2011/0258179 | A1* | 10/2011 | Weissman | G06F 16/24537 |
| | | | | 707/713 |
| 2012/0109943 | A1* | 5/2012 | Yang | G06F 16/532 |
| | | | | 707/723 |
| 2012/0124026 | A1* | 5/2012 | Grois | G06F 16/951 |
| | | | | 707/E17.108 |
| 2013/0191397 | A1* | 7/2013 | Avadhanam | G06F 16/24578 |
| | | | | 707/E17.084 |
| 2013/0238595 | A1* | 9/2013 | Weissman | G06F 16/2425 |
| | | | | 707/713 |
| 2015/0052121 | A1* | 2/2015 | Sharifi | G06F 16/9535 |
| | | | | 707/723 |
| 2015/0234831 | A1* | 8/2015 | Prasanna Kumar | |
| | | | | G06F 16/2453 |
| | | | | 707/718 |
| 2016/0246886 | A1* | 8/2016 | Chakraborty | G06F 16/9535 |
| 2018/0121292 | A1* | 5/2018 | Kosaraju | G06F 11/1461 |
| 2018/0349384 | A1* | 12/2018 | Nerurkar | G06F 16/24578 |
| 2019/0220534 | A1* | 7/2019 | Singh | G06F 16/24542 |
| 2019/0354604 | A1* | 11/2019 | Filonov | G06F 16/3325 |
| 2020/0192920 | A1* | 6/2020 | Filonov | G06N 20/00 |
| 2020/0327154 | A1* | 10/2020 | Shelton | G06F 16/3328 |
| 2021/0042377 | A1 | 2/2021 | Zwicky et al. | |
| 2021/0357416 | A1* | 11/2021 | Tsubouchi | G06F 16/24575 |
| 2021/0365452 | A1* | 11/2021 | Lydick | G06F 16/242 |

OTHER PUBLICATIONS

"Rigorous Testing", accessed Jun. 4, 2021, 4 pages. https://www.google.com/search/howsearchworks/mission/users/.

Teevan et al., "To Personalize or Not to Personalize: Modeling Queries with Variation in User Intent" Microsoft Research Redmond, USA, Jul. 20-24, 2008, 8 pages. https://www.microsoft.com/en-us/research/uploads/prod/2008/07/Modeling-Queries-with-Variation-in-User-Intent-Ver-4-Fixed.pdf.

* cited by examiner

RANKING DATABASE QUERIES

TECHNICAL FIELD

The implementations of the disclosure generally relate to databases and, more specifically, to ranking database queries.

BACKGROUND

Databases are widely used in various types of businesses and applications. A database may store data or information in various formats, models, structures, or systems using different types of database structures. Users or processes may access or query the databases to fetch or retrieve data in a database. In recent years, the number of data that can be stored in a database has increased exponentially. This can cause problems when users submit queries for large amounts of data since it consumes too much time and resources to retrieve the data, which can impact the performance of businesses and applications.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for ranking database queries.

In various applications, users can submit queries for large amounts of data (e.g., records) to a database. Some applications allow users to select as much data as users would like to return from the database. However, processing a large query includes waiting until all requested records are queried from the database to the application. While the query is being processed, the user would wait in the application until the processing of the query is complete. Waiting for a query to be processed can cause the application to become unresponsive.

Aspects of the present disclosure address the above and other deficiencies by providing systems and methods for ranking the queries being processed. In some implementations, a user would be allowed to specify the upper limit of time for executing the set of queries. Furthermore, in some implementations, the user may also specify the ranking of the queries (e.g., by assigning, to each query, a numeric value indicating a relative priority of the query with respect to other queries of the set). Thus, the user would be able to choose the query execution mode.

In some implementations, the query execution mode may be the timed execution mode or the priority-based execution mode. The timed execution mode involves executing the set of queries until expiration of the specified upper time limit. The priority-based execution mode involves executing the set of queries according to their rankings. Some implementations of the present disclosure also include a bandwidth-limited execution mode. The bandwidth-limited execution mode involves executing the set of queries until the total amount of the returned data exceeds a predefined limit.

Some implementations of the present disclosure also include a hybrid execution mode implementing a combination of the previous two modes. In the hybrid execution mode, a specified weighting parameter may indicate a share of each respective execution mode in executing the set of queries: e.g., the weighting parameter of 0.3 would require executing 30% of queries within the specified upper time limit, while the remaining 70% of queries would be executed based on their respective rankings. In another illustrative example, the weighting parameter of 0 would require executing all queries within the specified upper time limit. In yet another illustrative example, the weighting parameter of 1 would require executing all queries based on their respective rankings.

Thus, by ranking the queries being processed and/or setting a time limit on executing the queries, implementations of the present disclosure may significantly improve the efficiency and performance of submitting queries to a database from an application and reduce a user's waiting time in an application. Instead of the application and/or the user waiting until the completion of the execution of the queries, portions of the records being requested using the queries can be returned to the application for the user based on a ranking assigned to each query and/or a time limit on executing the queries. Thus, users can receive the records requested via their queries in multiple portions, ranked in order of importance to the user and/or application.

Various aspects of the above referenced methods and systems are described in details herein below by way of examples, rather than by way of limitation.

Figure 1:
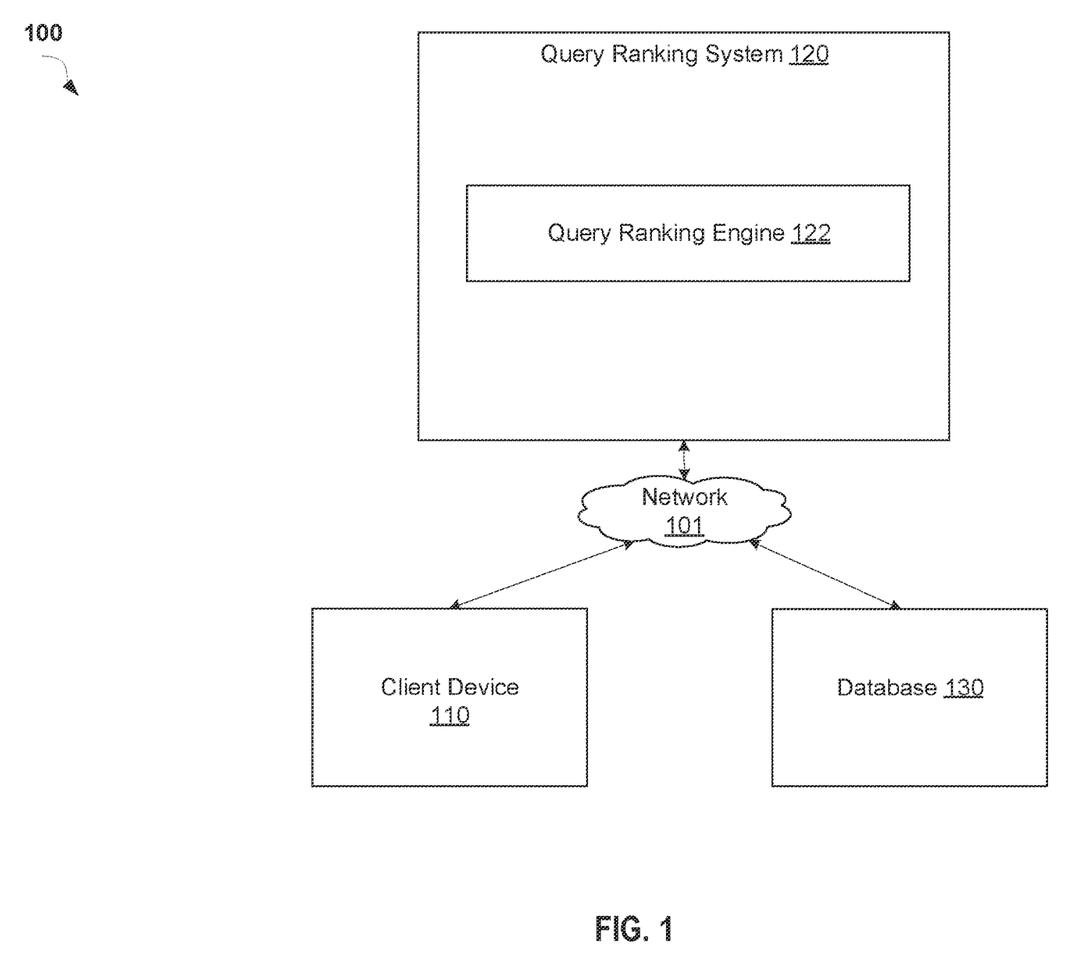
FIG. 1 depicts a block diagram of a network architecture 100 in accordance with one or more aspects of the present disclosure.

FIG. 1 depicts a block diagram of a network architecture 100 in which implementations of the disclosure may operate. Although implementations of the disclosure are described in accordance with a certain type of system, this should not be considered as limiting the scope or usefulness of the features of the disclosure.

As shown in FIG. 1, the network architecture 100 includes a query ranking system 120 communicably coupled to a client device 110 and a database 130 via network 101. Network 101 may be a private network (e.g., a local area network (LAN), a wide area network (WAN), intranet, or other similar private networks) or a public network (e.g., the Internet). Query ranking system 120 may include one or more machines such as server computers, desktop computers, or any other computing device.

The client device 110 may be personal computers (PC), laptops, mobile phones, tablet computers, or any other computing devices. The client device 110 may run an operating system (OS) that manages hardware and software of the client device 110. An application or a daemon (not shown) may run on the client device 110 (e.g., on the OS of each client device) to enable a user to submit a query and receive the results of the query.

Database 130 may be implemented on one or more machines, such as server computers, desktop computers, or any other computing device. An example of the database 130 is a persistent storage that is capable of storing data that is collected from various data sources including local and remote computing devices such as desktop computers, laptop computers, handheld computers, server computers, gateway computers, mobile communications devices, cell phones, smart phones, or similar computing device. In some embodiments, database 130 might be a network-attached file server, while in other embodiments administration database 130 might be some other type of persistent storage such as an object-oriented database, a relational database, and so forth. The database 130 may be part of the query ranking system 120 or coupled to the query ranking system 120 directly or via a network. In an example, the database 130 can be a relational database management system (RDBMS) used for the storage of information used for financial records, manufacturing and logistical information, personnel data, and the like. In an example, the database 130 can include processing logic to enable a search for, ranking of, and retrieval of the query results.

The query ranking system 120, of examples of the disclosure, can receive queries from the client device 110, rank the queries, and execute the queries according to the ranking (s) and/or within a time limit. For example, the query ranking system 120 may oversee and manage the ranking of the queries in order to retrieve portions of records from the database 130 according to the rankings by ranking the queries using a ranking algorithm. The query ranking system 120 may be implemented on one or more machines, such as server computers, desktop computers, or any other computing device.

The query ranking system 120 may include a query ranking engine 122. The query ranking system 120 can receive queries from one or more client devices 110. The queries can be ranked by the query ranking engine 122 using a ranking algorithm to determine the ranking value to be assigned to each of the queries.

Figure 2:
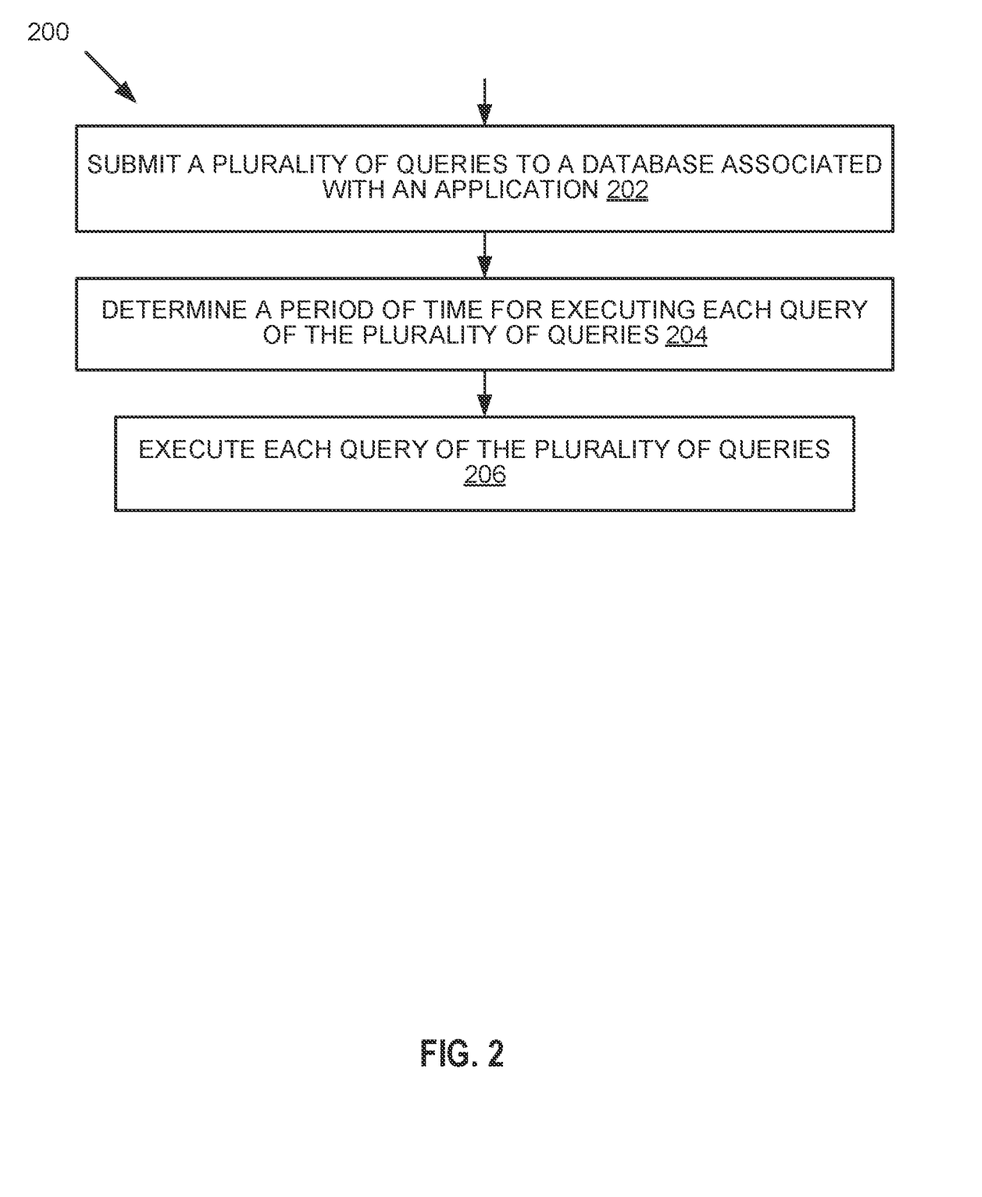
FIG. 2 depicts a flow diagram illustrating an example method of ranking queries in accordance with some implementations of the present disclosure.

FIG. 2 is a flow diagram illustrating an example method 200 for ranking database queries in accordance with one or more aspects of the present disclosure. Method 200 may be performed by processing logic (e.g., in computer system 400 of FIG. 4) that may comprise hardware (e.g., circuitry, dedicated logic, programmable logic, microcode, etc.), software (such as instructions run on a processing device), firmware, or a combination thereof.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 2, in one embodiment, method 200 begins at block 202, where a query ranking system (e.g., query ranking system 120 of FIG. 1) submits a set of queries to a database. In some embodiments, the set of queries can be submitted by a processing device. In some embodiments, the set of queries is submitted by a user via a client device (e.g., the client device 110). For example, the user can submit the set of queries via an application on the client device. The database can be connected to the application. In some embodiments, each query of the set of queries can include a request for one or more records from the database. Each record can be a set of data stored in the database.

At block 204, the query ranking system specifies the upper time limit for executing each query of the set of queries. In some embodiments, the query ranking system can specify the upper time limit based on input received by a user. For example, the upper time limit can be a fixed time limit (e.g., 1 second). In some embodiments, the query ranking system can assign a default upper time limit. For example, the default upper time limit can be a fixed time limit (e.g., 1 second). In some embodiments, the query ranking system further identifies a ranking assigned to each query. Each query can be assigned to a ranking based on a ranking algorithm. In some embodiments, the ranking can be specified by the user. In some embodiments, the ranking can be specified based on parameters associated with the query and/or application.

In some embodiments, the query ranking system can identify a weighting parameter associated with the database. The weighting parameter can be a value associated with the database. In some embodiments, the weighting parameter can be predetermined and maintained in metadata associated with the database. In some embodiments, the weighting parameter can be based on input received by the user. In some embodiments, the query ranking system can identify whether the weighting parameter is a minimum value (e.g., 0). In response to identifying that the weighting parameter is a minimum value, the query ranking system can execute each query of the set of queries within the identified period of time. In some embodiments, the query ranking system can identify that the weighting parameter is a maximum value (e.g., 1). In response to identifying that the weighting parameter is a maximum value, the query ranking system can execute each query of the set of queries according to the identified ranking assigned to each query. In some embodiments, the query ranking system can identify that the weighting parameter is a value between the minimum value and the maximum value (e.g., 0.5). In response to identifying that the weighting parameter is a value between the minimum value and the maximum value, the query ranking system can execute a first group of the set of queries within the identified period of time and another group of the set of queries according to the identified ranking assigned to each query. For example, if there are 1000 records to be returned from the set of queries and the weighting parameter is 0.5, the query ranking system can execute the first 500 records within the identified period of time (e.g., 1 second), and the query ranking system can execute the next 500 records according to the identified ranking assigned to each query.

In some embodiments, the query ranking system can identify a memory and/or bandwidth associated with the database. For example, the query ranking system can identify the memory bandwidth of a software component running the database. In some embodiments, the query ranking system can execute each query of the set of queries according to the identified memory bandwidth (e.g., execute each query such that the memory bandwidth associated with the database is not exceeded).

In some embodiments, the query ranking system can identify other types of parameters for executing each query of the set of queries according to a user and/or application's preference. Each parameter can be a control for splitting the records to be returned from each query of the set of queries into one or more portions of one or more records.

At block 206, the query ranking system executes each query of the set of queries. In some embodiments, the set of queries is executed until expiration of the specified upper time limit. Upon reaching the specified upper time limit, the execution is interrupted, and the partial result set is returned. In some embodiments, executing each query includes executing each query of the set of queries according to the ranking assigned to each query as discussed with regard to block 204, i.e., in the order of the respective ranking values. In some embodiments, executing each query includes executing each query according to the specified memory bandwidth limit as discussed with regard to block 204. In some embodiments, executing each query includes executing a first group of the set of queries within the identified period of time and another group of the set of queries according to the ranking assigned to each query, as discussed with regard to block 204.

In some embodiments, if the query ranking system is to execute each query based at least in part on the ranking assigned to each query, the query can further execute each query based on an aging parameter associated with the database. In some embodiments, the aging parameter can be predetermined and maintained in metadata associated with the database. In some embodiments, the query ranking system can identify whether the aging parameter is a maximum value (e.g., 1). In response to identifying that the aging parameter is a maximum value, the query ranking system can execute each query based on all queries assigned to rankings. In some embodiments, the query ranking system can identify that the aging parameter is a minimum value (e.g., 0). In response to identifying that the aging parameter is a minimum value, the query ranking system can execute each query based on a portion of all queries assigned to rankings. In some embodiments, the query ranking system can identify that the aging parameter is a value between the maximum value and the minimum value (e.g., 0.5). In response to identifying that the aging parameter is a value between the maximum value and the minimum value, the query ranking system can execute the queries based on a ranking assigned to half (50%) of the queries of the set of queries.

In some embodiments, in response to executing each query of the set of queries, the query ranking system can identify the number of records returned in the set of portions of the one or more records.

Figure 3:
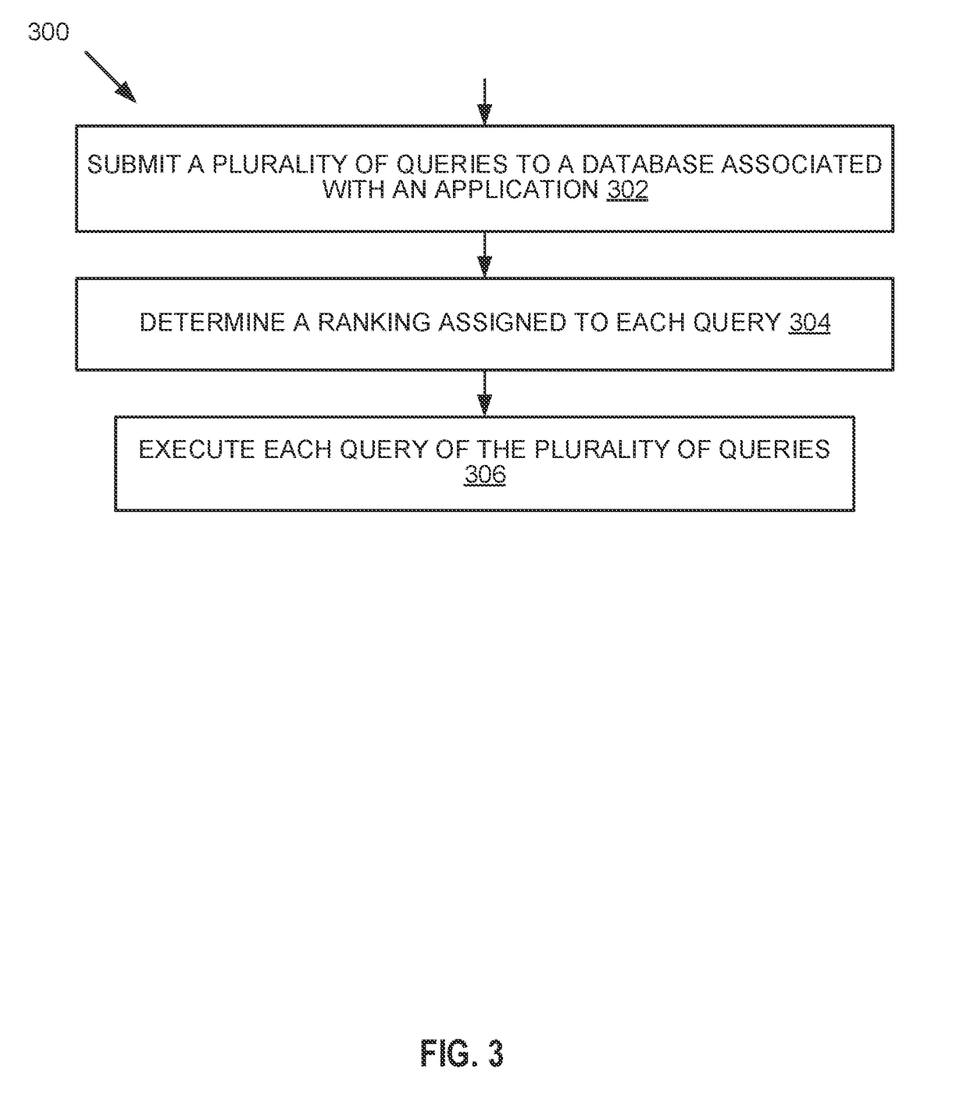
FIG. 3 depicts a flow diagram illustrating an example method of ranking queries in accordance with some implementations of the present disclosure.

FIG. 3 is a flow diagram illustrating an example method 300 for ranking database queries in accordance with one or more aspects of the present disclosure. Method 300 may be performed by processing logic (e.g., in computer system 400 of FIG. 4) that may comprise hardware (e.g., circuitry, dedicated logic, programmable logic, microcode, etc.), software (such as instructions run on a processing device), firmware, or a combination thereof.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 3, in one embodiment, method 300 begins at block 302, where a query ranking system (e.g., query ranking system 120 of FIG. 1) submits a set of queries to a database. In some embodiments, the set of queries can be submitted by a processing device. In some embodiments, the set of queries is submitted by a user via a client device (e.g., the client device 110). For example, the user can submit the set of queries via an application on the client device. The database can be connected to the application. In some embodiments, each query of the set of queries can include a request for one or more records from the database. Each record can be a set of data stored in the database.

At block 304, the query ranking system identifies a ranking assigned to each query. Each query can be assigned to a ranking based on a ranking algorithm. In some embodiments, the ranking can be specified by the user. In some embodiments, the ranking can be specified based on parameters associated with the query and/or application. In some embodiments, the query ranking system specifies the upper time limit for executing each query of the set of queries. In some embodiments, the query ranking system can specify the upper time limit based on input received by a user. For example, the upper time limit can be a fixed time limit (e.g., 1 second). In some embodiments, the query ranking system can assign a default upper time limit. For example, the default upper time limit can be a fixed time limit (e.g., 1 second).

In some embodiments, the query ranking system can identify a weighting parameter associated with the database. The weighting parameter can be a value associated with the database. In some embodiments, the weighting parameter can be predetermined and maintained in metadata associated with the database. In some embodiments, the weighting parameter can be specified by input received by the user. In some embodiments, the query ranking system can identify whether the weighting parameter is a minimum value (e.g., 0). In response to identifying that the weighting parameter is a minimum value, the query ranking system can execute each query of the set of queries within the identified period of time. In some embodiments, the query ranking system can identify that the weighting parameter is a maximum value (e.g., 1). In response to identifying that the weighting parameter is a maximum value, the query ranking system can execute each query of the set of queries according to the identified ranking assigned to each query. In some embodiments, the query ranking system can identify that the weighting parameter is a value between the minimum value and the maximum value (e.g., 0.5). In response to identifying that the weighting parameter is a value between the minimum value and the maximum value, the query ranking system can execute a first group of the set of queries within the identified period of time and another group of the set of queries according to the identified ranking assigned to each query. For example, if there are 1000 records to be returned from the set of queries and the weighting parameter is 0.5, the query ranking system can execute the first 500 records within the identified period of time (e.g., 1 second), and the query ranking system can execute the next 500 records according to the identified ranking assigned to each query.

In some embodiments, the query ranking system can identify a memory and/or bandwidth associated with the database. For example, the query ranking system can identify the memory bandwidth of a software component running the database. In some embodiments, the query ranking system can execute each query of the set of queries according to the identified memory bandwidth (e.g., execute each query such that the memory bandwidth associated with the database is not exceeded).

In some embodiments, the query ranking system can identify other types of parameters for executing each query of the set of queries according to a user and/or application's preference. Each parameter can be a control for splitting the records to be returned from each query of the set of queries into one or more portions of one or more records.

At block 306, the query ranking system executes each query of the set of queries. In some embodiments, the set of queries is executed until expiration of the specified upper time limit. Upon reaching the specified upper time limit, the execution is interrupted, and the partial result set is returned. In some embodiments, executing each query includes executing each query of the set of queries according to the ranking assigned to each query as discussed with regard to block 204, i.e., in the order of the respective ranking values. In some embodiments, executing each query includes executing each query according to the specified memory bandwidth limit as discussed with regard to block 304. In some embodiments, executing each query includes executing a first group of the set of queries within the identified period of time and another group of the set of queries according to the ranking assigned to each query, as discussed with regard to block 304.

In some embodiments, if the query ranking system is to execute each query based at least in part on the ranking assigned to each query, the query can further execute each query based on an aging parameter associated with the database. In some embodiments, the aging parameter can be predetermined and maintained in metadata associated with the database. In some embodiments, the query ranking system can identify whether the aging parameter is a maximum value (e.g., 1). In response to identifying that the aging parameter is a maximum value, the query ranking system can execute each query based on all queries assigned to rankings. In some embodiments, the query ranking system can identify that the aging parameter is a minimum value (e.g., 0). In response to identifying that the aging parameter is a minimum value, the query ranking system can execute each query based on a portion of all queries assigned to rankings. In some embodiments, the query ranking system can identify that the aging parameter is a value between the maximum value and the minimum value (e.g., 0.5). In response to identifying that the aging parameter is a value between the maximum value and the minimum value, the query ranking system can execute the queries based on a ranking assigned to half (50%) of the queries of the set of queries.

In some embodiments, in response to executing each query of the set of queries, the query ranking system can identify the number of records returned in the set of portions of the one or more records.

Figure 4:
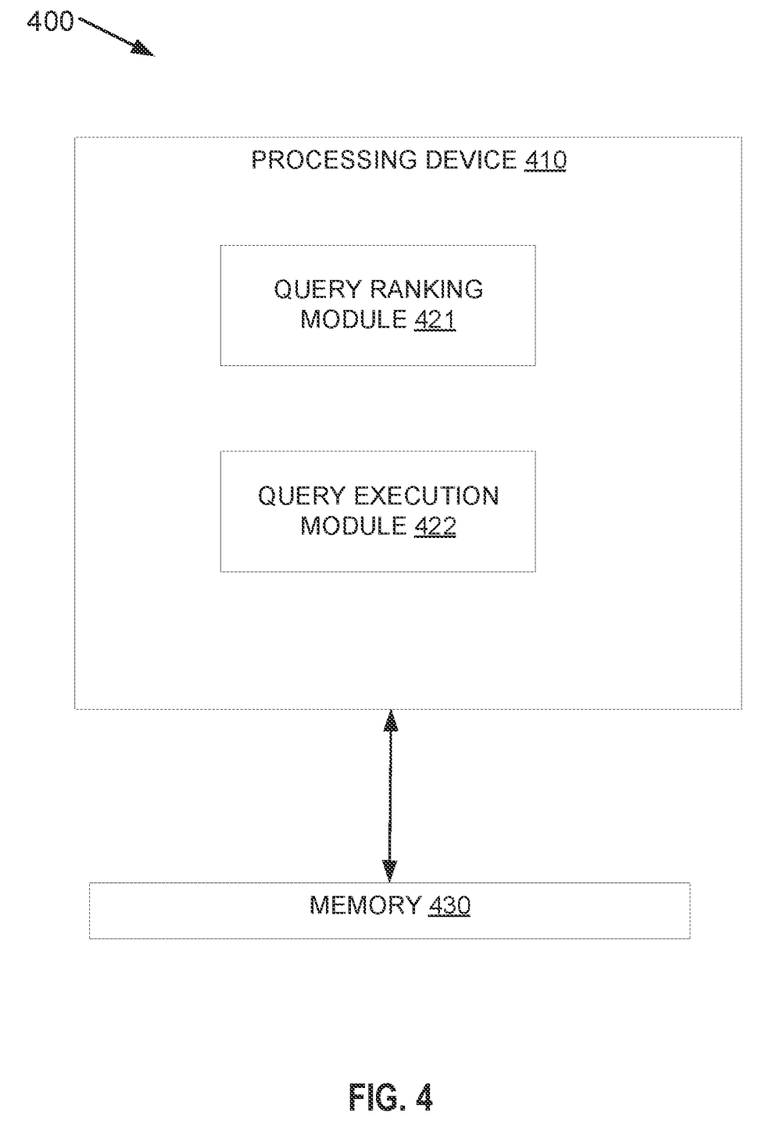
FIG. 4 depicts a block diagram example of a computer system operating in accordance with one or more aspects of the present disclosure.

FIG. 4 is a block diagram example of a computer system 400 operating in accordance with one or more aspects of the present disclosure. Computer system 400 may be the same or similar to the query ranking system 120 of FIG. 1 and may include one or more processing devices and one or more memory devices. In the example shown, computer system 400 may include query ranking module 421 and query execution module 422. Alternatively, the functionality of one or more of query ranking module 421 and query execution module 422 may be combined into a single module or divided into multiple sub-modules.

Query ranking module 421 is responsible for ranking each query of the set of queries submitted, e.g., by a user, via an application to a database connected to the application. For example, query ranking module 421 is responsible for identifying the ranking assigned to each query based on a ranking algorithm. Query ranking module 421 is further responsible for identifying a weighting parameter associated with the database and whether the weighting parameter is a minimum value, maximum value, or value in between the minimum and maximum value. Query ranking module 421 is further responsible for identifying the ranking for each query based on an aging parameter associated with the database. Query ranking module 421 is responsible for identifying a memory and/or channel bandwidth associated with the database. Query ranking module 421 is further responsible for identifying a period of time within which to execute each query of the set of queries. Further details with regard to the query ranking module is described herein above with reference to FIGS. 2 and 3.

Query execution module 422 is responsible for executing each query of the set of queries submitted to the database according to the ranking assigned to each query and/or the identified period of time for executing each query of the set of queries. Query execution module 422 is further responsible for executing each query of the set of queries according to the memory bandwidth and/or channel bandwidth associated with the database. Further details with regard to the query execution module is described herein above with reference to FIGS. 2 and 3.

Figure 5:
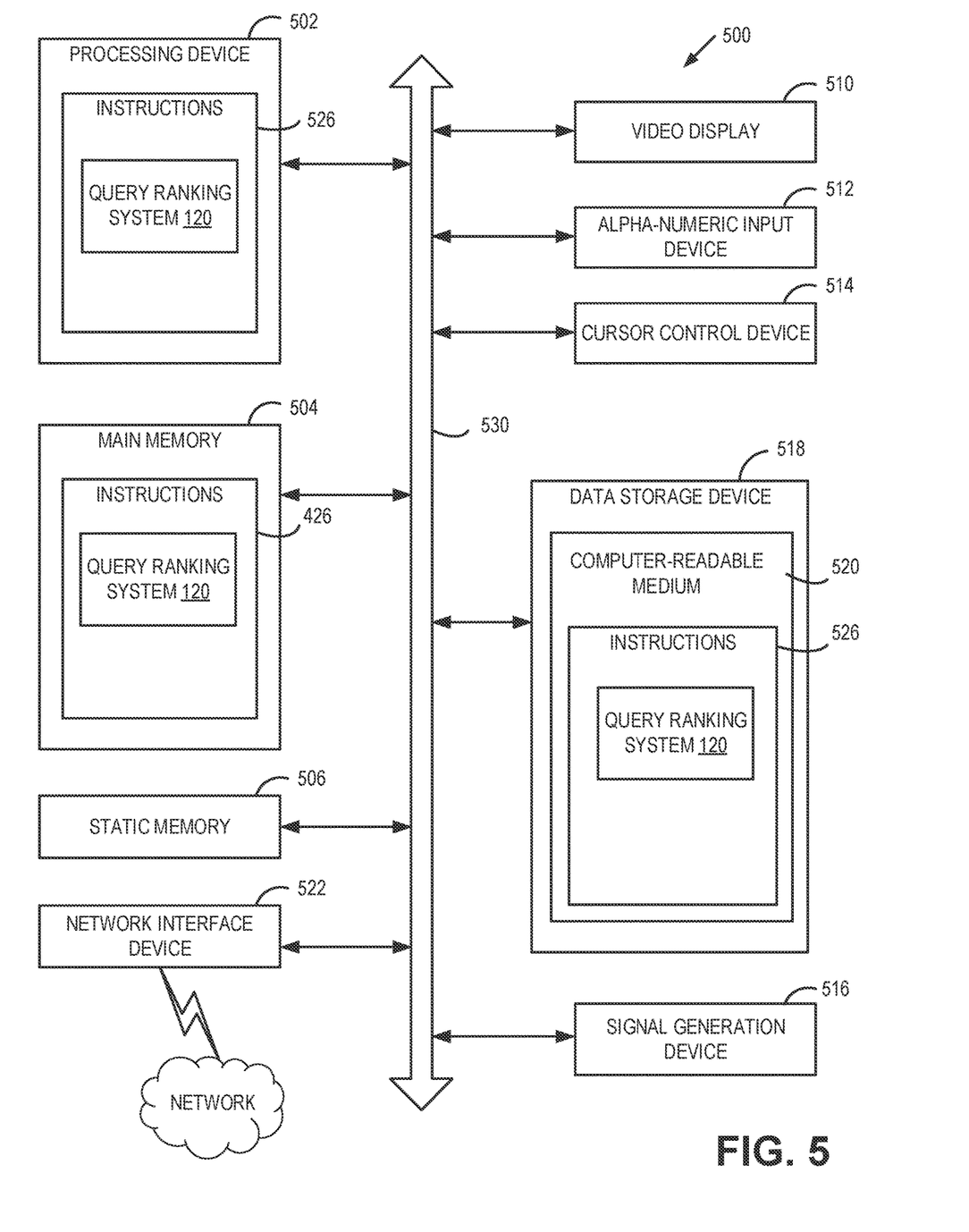
FIG. 5 depicts a block diagram that illustrates one implementation of a computer system in accordance with one or more aspects of the present disclosure.

FIG. 5 is a diagrammatic representation of a machine in the exemplary form of a computer system 500 within which a set of instructions for causing the machine to perform any one or more of the methodologies discussed herein may be executed. In various illustrative examples, computer system 500 may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 500 may include a processing device 502, a main memory 504 (e.g., read-only memory (ROM), flash memory, dynamic random access memory (DRAM) (such as synchronous DRAM (SDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 502 may also be one or more special-purpose processing devices such as an application specific integrated circuit (ASIC), a field programmable gate array (FPGA), a digital signal processor (DSP), network processor, or the like. Processing device 502 may be configured to execute query ranking system 120 for programming the operations and steps discussed herein.

Computer system 500 may further include a network interface device 508. Computer system 500 may also include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 520 having one or more sets of instructions (e.g., instructions executed by the query ranking system 120) for the computer system 500 embodying any one or more of the methodologies of functions described herein. The instructions 526 for the computer system 500 may also reside, completely or at least partially, within main memory 504 and/or within processing device 502 during execution thereof by computer system 500; main memory 504 and processing device 502 also constituting machine-readable storage media. The instructions 526 may further be transmitted or received over a network 526 via network interface device 508.

Machine-readable storage medium 520 may also be used to store the device queue manner logic persistently. While machine readable storage medium 520 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling," "transmitting," "requesting," "identifying," "querying," "retrieving," "forwarding," "determining," "passing," "processing," "issuing," "measuring," "caching," "monitoring," mapping," "estimating," "calculating," "disabling," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required method 200 and/or method 300, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
submitting, by a query ranking system for reducing a period of time to return one or more records from a database associated with an application running on a client device, a plurality of queries to database associated with the application, wherein each query of the plurality of queries comprises a request for the one or more records from the database;
assigning, by the query ranking system, a period of time for executing each query of the plurality of queries;
determining, by the query ranking system, a ranking assigned to each query of the plurality of queries, wherein the ranking comprises a numeric value assigned to each query indicating a relative priority of each query to one or more queries of the plurality of queries;
determining a value of an aging parameter and a value of a weighting parameter associated with the database; and
in response to determining that the value of the aging parameter and the value of the weighting parameter are each a respective value between a minimum value and a maximum value, executing, by the query ranking system, each query of the plurality of queries within the assigned period of time and according to the ranking assigned to each query, wherein executing each query comprises returning a first set of portions of the one or more records within the assigned period of time and a second set of portions of the one or more records in the order corresponding to the ranking assigned to each query.

2. The method of claim 1, further comprising:
identifying the weighting parameter associated with the database;
responsive to identifying that the weighting parameter satisfies a first condition, executing each query within the assigned period of time; and
responsive to identifying that the weighting parameter satisfies a second condition, executing each query according to the ranking assigned to each query.

3. The method of claim 2, wherein the first condition specifies the minimum value and the second condition specifies the maximum value.

4. The method of claim 2, further comprising:
responsive to identifying that the weighting parameter satisfies a third condition, executing a first set of the plurality of queries within the assigned period of time and executing a second set of the plurality of queries according to the ranking assigned to each query.

5. The method of claim 1, further comprising:
determining a memory bandwidth associated with the database; and
executing each query according to the memory bandwidth.

6. The method of claim 1, further comprising:
determining a number of records returned of each set of portions of the one or more records.

7. The method of claim 1, further comprising:
in response to determining that the value of the aging parameter and the value of the weighting parameter are each a respective minimum value, executing, by the query ranking system, each query of the plurality of queries to return the first set of portions of the one or more records from the database within the assigned period of time.

8. The method of claim 1, further comprising:
in response to determining that the value of the aging parameter and the value of the weighting parameter are each a respective maximum value, executing, by the query ranking system, each query of the plurality of queries according to the ranking assigned to each query, wherein executing each query comprises returning the second set of portions of the one or more records from the database in an order corresponding to the ranking assigned to each query.

9. A system, comprising:
a memory;
a processing device operatively coupled to the memory, the processing device configured to:
submit, by a query ranking system for reducing a period of time to return one or more records from a database associated with an application running on a client device, a plurality of queries to the database associated with the application, wherein each query of the plurality of queries comprises a request for the one or more records from the database;
assigning, by the query ranking system, a period of time for executing each query of the plurality of queries;
determine, by the query ranking system, a ranking assigned to each query of the plurality of queries, wherein the ranking comprises a numeric value assigned to each query indicating a relative priority of each query to one or more queries of the plurality of queries, and wherein determining the ranking comprises determining a value of an aging parameter and a value of a weighting parameter associated with the database; and
in response to determining that the value of the aging parameter and the value of the weighting parameter are each a respective value between a minimum value and a maximum value, execute, by the query ranking system, each query of the plurality of queries within the assigned period of time and according to the ranking assigned to each query, wherein executing each query comprises returning a first set of portions of the one or more records within the assigned period of time and a second set of portions of the one or more records in the order corresponding to the ranking assigned to each query.

10. The system of claim 9, further comprising:
identifying the weighting parameter associated with the database;
responsive to identifying that the weighting parameter satisfies a first condition, executing each query within the assigned period of time; and
responsive to identifying that the weighting parameter satisfies a second condition, executing each query according to the ranking assigned to each query.

11. The system of claim 10, wherein the first condition specifies the minimum value and the second condition specifies the maximum value.

12. The system of claim 10, responsive to identifying that the weighting parameter satisfies a third condition, executing a first set of the plurality of queries within the assigned period of time and executing a second set of the plurality of queries according to the ranking assigned to each query.

13. The system of claim 9, further comprising:
determining a memory bandwidth associated with the database; and
executing each query according to the memory bandwidth.

14. The system of claim 9, further comprising:
determining a number of records returned of each set of portions of the one or more records.

15. A non-transitory machine-readable storage medium storing instructions that cause a processing device to:
submit, by a query ranking system for reducing a period of time to return one or more records from a database associated with an application running on a client device, a plurality of queries to the database associated with the application, wherein each query of the plurality of queries comprises a request for the one or more records from the database;

assign, by the query ranking system, a period of time for executing each query of the plurality of queries;

determine, by the query ranking system, a ranking assigned to each query of the plurality of queries, wherein the ranking comprises a numeric value assigned to each query indicating a relative priority of each query to one or more queries of the plurality of queries, and wherein determining the ranking comprising determining a value of an aging parameter and a value of a weighting parameter associated with the database; and in response to determining that the value of the aging parameter and the value of the weighting parameter are each a respective value between a minimum value and a maximum value, execute, by the query ranking system, each query of the plurality of queries within the assigned period of time and according to the ranking assigned to each query, wherein executing each query comprises returning a first set of portions of the one or more records within the assigned period of time and a second set of portions of the one or more records in the order corresponding to the ranking assigned to each query.

16. The non-transitory machine-readable storage medium of claim 15, wherein the processing device is further to:

identify the weighting parameter associated with the database;

responsive to identifying that the weighting parameter satisfies a first condition, execute each query within the assigned period of time; and responsive to identifying that the weighting parameter satisfies a second condition, execute each query according to the ranking assigned to each query.

17. The non-transitory machine-readable storage medium of claim 16, wherein the first condition specifies the minimum value and the second condition specifies the maximum value.

18. The non-transitory machine-readable storage medium of claim 16, wherein the processing device is further to:

responsive to identifying that the weighting parameter satisfies a third condition, execute a first set of the plurality of queries within the assigned period of time and execute a second set of the plurality of queries according to the ranking assigned to each query.

19. The non-transitory machine-readable storage medium of claim 15, wherein the processing device is further to:

determine a memory bandwidth associated with the database; and execute each query according to the memory bandwidth.

20. The non-transitory machine-readable storage medium of claim 15, wherein the processing device is further to:

determine a number of records returned of each set of portions of the one or more records.

* * * * *